United States Patent
Brunetto

(10) Patent No.: US 10,518,339 B2
(45) Date of Patent: Dec. 31, 2019

(54) TANGENTIALLY MOUNTED CUTTING INSERT WITH ANGLED SEATING SURFACE AND RECESSED CLEARANCE SURFACE

(71) Applicant: Kennametal Inc., Latrobe, PA (US)

(72) Inventor: Lance David Brunetto, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 86 days.

(21) Appl. No.: 15/465,942

(22) Filed: Mar. 22, 2017

(65) Prior Publication Data

US 2018/0272444 A1 Sep. 27, 2018

(51) Int. Cl.
*B23C 5/20* (2006.01)
*B23C 5/10* (2006.01)

(52) U.S. Cl.
CPC .............. *B23C 5/207* (2013.01); *B23C 5/109* (2013.01); *B23C 5/202* (2013.01); *B23C 2200/0472* (2013.01); *B23C 2200/164* (2013.01); *B23C 2200/367* (2013.01); *B23C 2210/168* (2013.01)

(58) Field of Classification Search
CPC ......... B23C 5/207; B23C 5/202; B23C 5/109; B23C 5/20; B23C 2200/367; B23C 2200/16; B23C 2200/161; B23C 2200/283; B23C 2210/0435; B23C 2210/0457

See application file for complete search history.

(56) References Cited

U.S. PATENT DOCUMENTS

| | | | |
|---|---|---|---|
| 4,182,587 A | 1/1980 | Striegl | |
| 4,294,565 A | 10/1981 | Erkfritz | |
| 4,573,831 A * | 3/1986 | Lacey | B23C 5/2213 407/114 |
| 4,812,087 A | 3/1989 | Stashko | |
| 5,190,417 A * | 3/1993 | Arai | B23C 5/2221 407/114 |
| 5,863,156 A | 1/1999 | Satran et al. | |

(Continued)

FOREIGN PATENT DOCUMENTS

| | | | | |
|---|---|---|---|---|
| DE | 102010046848 A1 * | 3/2012 | | B23B 27/04 |
| EP | 0 308 874 A2 | 3/1989 | | |

(Continued)

*Primary Examiner* — Ryan C Rufo
(74) *Attorney, Agent, or Firm* — Matthew S. Bedsole

(57) ABSTRACT

A milling insert includes a first axial face, a second axial face, a first radial face, a second radial face parallel with the first radial face, a cutting face, and a generally V-shaped seating face formed with a first seating surface and a second seating surface. The first axial face defines a secondary clearance surface that is at least partially axially recessed from the first axial face and oblique to the first radial face. The first seating surface and the second seating surface are formed at an angle substantially equal to a radial rake angle when the cutting insert is mounted in the insert seat of the milling cutter. As a result, the seating face produces at least one seating surface that is substantially perpendicular to the tangential cutting force, $F_T$, thereby reducing movement of the insert when tangentially mounted in the insert seat of the milling cutter.

16 Claims, 5 Drawing Sheets

(56) References Cited

U.S. PATENT DOCUMENTS

| | | | |
|---|---|---|---|
| 6,238,146 B1* | 5/2001 | Satran | B23B 27/1614 407/113 |
| 6,811,359 B2 | 11/2004 | Craig | |
| 7,063,489 B2 | 6/2006 | Satran | |
| 7,090,444 B1 | 8/2006 | Craig | |
| 7,229,236 B2 | 6/2007 | Craig | |
| 7,753,625 B2 | 7/2010 | Craig | |
| 9,044,813 B2 | 6/2015 | Choi et al. | |
| 9,682,433 B2* | 6/2017 | Choi | B23C 5/06 |
| 2007/0104546 A1* | 5/2007 | Maeta | B23C 5/06 407/113 |
| 2009/0136304 A1* | 5/2009 | Satran | B23C 5/207 407/104 |
| 2011/0164932 A1* | 7/2011 | Choi | B23C 5/06 407/40 |
| 2011/0236143 A1* | 9/2011 | Ryu | B23C 5/2221 407/103 |
| 2012/0039678 A1* | 2/2012 | Nguyen | B23C 5/109 407/113 |
| 2012/0051851 A1* | 3/2012 | Saito | B23C 5/109 407/42 |
| 2012/0195700 A1* | 8/2012 | Chen | B23C 5/06 407/40 |
| 2014/0348599 A1* | 11/2014 | Kovac | B23B 27/1611 407/42 |
| 2015/0183034 A1* | 7/2015 | Stark | B23C 5/109 407/48 |
| 2016/0039015 A1* | 2/2016 | Matsubara | B23C 5/207 407/114 |
| 2017/0297120 A1* | 10/2017 | Fang | B23C 5/2247 |

FOREIGN PATENT DOCUMENTS

| | | | | |
|---|---|---|---|---|
| EP | 2450138 A1 * | 5/2012 | | B23C 5/207 |
| WO | WO 2015163436 A1 * | 10/2015 | | B23C 5/06 |

* cited by examiner

TANGENTIALLY MOUNTED CUTTING INSERT WITH ANGLED SEATING SURFACE AND RECESSED CLEARANCE SURFACE

FIELD OF THE INVENTION

The present invention relates to a cutting insert and, more particularly, to a tangentially mounted milling insert with angled seating surfaces and a recessed clearance surface for allowing the milling insert to be mounted with a relatively small helix angle.

BACKGROUND OF THE INVENTION

Tangentially mounting an insert in a milling cutter can improve the stability of the insert-to-pocket connection (the insert is less likely to move independently, or try to "twist out" of the pocket). By reducing this insert movement with respect to the pocket, the dominant contributor to insert instability becomes deformation of the insert pocket.

A secondary problem with tangentially mounted inserts occurs when designing a helical cutter. Because of the mounting orientation of the insert, and the length of the insert in that direction, it is difficult to reach smaller helix angles (i.e., <45°). Larger helix angles require more space, and so flute density is limited.

The present invention has been developed in view of the foregoing.

SUMMARY OF THE INVENTION

The problem of reducing movement of a tangentially mounted insert is solved by providing a cutting insert with an angled seating surface that is substantially equal to a radial rake angle of the cutting insert when mounted in a pocket of a cutter.

In one aspect of the invention, a milling insert comprises a first axial face, a second axial face, a first radial face, a second radial face parallel with the first radial face, a through-hole passing from the first radial face to the second radial face for tangentially mounting the milling insert in a milling cutter, a cutting face, and a generally V-shaped seating face. The cutting face defines a plurality of cutting edges at intersections between the cutting face and the first axial face, the second axial face, the first radial face, and the second radial face, and the milling insert is indexable about an axis perpendicular to the through-hole and passing through the cutting face.

In another aspect of the invention, a milling cutter comprises at least one generally V-shaped insert seat having a first seating surface and a second seating surface, and a milling insert mounted in the at least one generally V-shaped insert seat. The milling insert comprises a first axial face, a second axial face, a first radial face, a second radial face parallel with the first radial face, a through-hole passing from the first radial face to the second radial face for tangentially mounting the milling insert in a milling cutter, a cutting face, and a generally V-shaped seating face. The cutting face defines a plurality of cutting edges at intersections between the cutting face and the first axial face, the second axial face, the first radial face, and the second radial face, and the milling insert is indexable about an axis perpendicular to the through-hole and passing through the cutting face.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figures 1, 2:
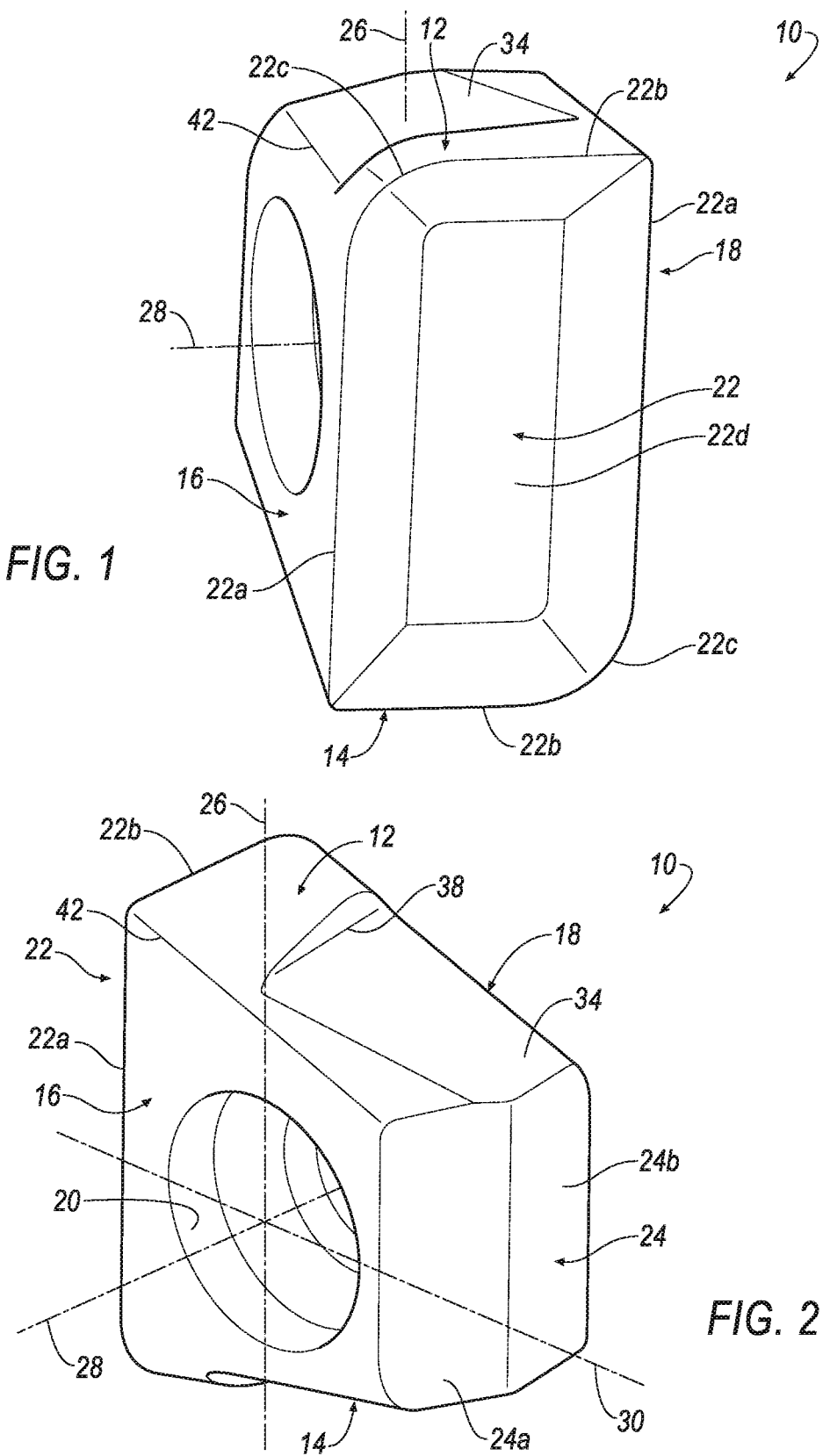
FIG. 1 is an isometric view of a cutting insert with an angled seating surface and recessed clearance surface in accordance with an aspect of the invention.
FIG. 2 is another isometric view of the cutting insert of FIG. 1.

Referring now to FIGS. 1-5, a cutting insert 10, such as a milling insert, is shown according to an embodiment of the invention. In general, the cutting insert 10 has a first axial face 12, a second axial face 14 opposite the first axial face 12, a first radial face 16, a second radial face 18 substantially parallel with the first radial face 16, a through-hole 20 passing from the first radial face 16 to the second radial face 18 for tangentially mounting the milling insert 10 in a milling cutter 100, a cutting face 22, and a generally V-shaped seating face, shown generally at 24. In the illustrated embodiment, the cutting insert 10 has an axis 26 passing through the first and second axial faces 12, 14, an axis 28 passing the through-hole 20, and is indexable about an axis 30 passing through the cutting face 22. It should be understood that the axis 26 is substantially perpendicular to the axis 28 and the axis 30.

The cutting face 22 defines a plurality of cutting edges at intersections between the cutting face 22 and the first axial face 12, the second axial face 14, the first radial face 16, and the second radial face 18. Specifically, the cutting face 22 is substantially rectangular and defines two major cutting edges 22a at intersections between the cutting face 22 and the first radial face 16 and the second radial face 18, two minor cutting edges 22b at intersections between the cutting face 22 and the first axial face 12 and the second axial face 14, and two corner cutting edges 22c extending between the two major cutting edges 22a and the two minor cutting edges 22b. The cutting face 22 also includes a central planar surface 22d that is at least partially radially recessed from the cutting edges 22a, 22b, 22c.

In one aspect of the invention, the generally V-shaped seating face 24 has a first seating surface 24a and a second seating surface 24b disposed at an angle, $\theta_1$, relative to the first seating surface 24a. In one embodiment, the angle, $\theta_1$, can be in a range between about $120°<\theta_1<180°$. In another embodiment, the angle, $\theta_1$, can be in a range between about $135°\leq\theta_1\leq165°$. In yet another embodiment, the angle, $\theta_1$, is equal to about 150°.

Figure 3:
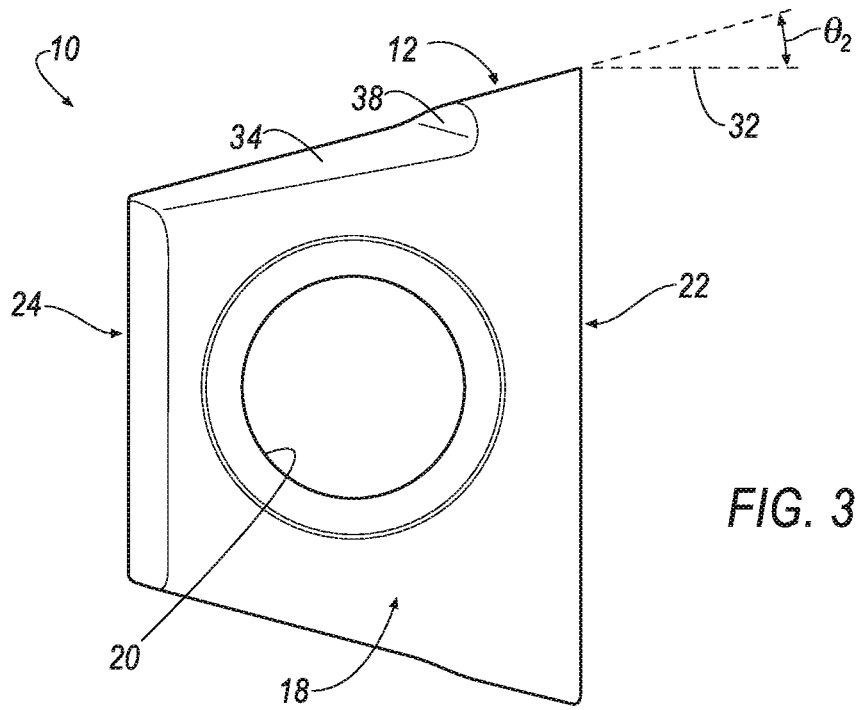
FIG. 3 is a front view of the cutting insert of FIG. 1.

As shown in FIG. 3, the first axial face 12 is disposed at a clearance angle, $\theta_2$, relative to a plane 32 perpendicular to the cutting face 22. In one embodiment, the clearance angle, $\theta_2$, is in a range between about $0°<\theta_2\leq30°$. In another embodiment, the clearance angle, $\theta_2$, is in a range between about $0°<\theta_2\leq 20°$. In yet another embodiment, the clearance angle, $\theta_2$, is equal to about 15°.

In one aspect of the invention, the first axial face 12 defines a secondary clearance surface 34. The secondary clearance surface 34 is at least partially axially recessed from the first axial face 12 and oblique to the first radial face 16. In other words, the secondary clearance surface 34 is disposed at an angle, $\theta_3$, relative to a plane 36 perpendicular to the first radial face 16 (and the second radial face 18). In one embodiment, the angle, $\theta_3$, is in a range between about $0°<\theta_3\leq 15°$. In another embodiment, the angle, $\theta_3$, is in a range between about $0°<\theta_3\leq 10°$. In yet another embodiment, the angle, $\theta_3$, is equal to about 4°.

The secondary clearance surface 34 defines a back wall 38 disposed at an angle, $\theta_4$, relative to a plane 40 perpendicular to the first radial face 16 (and the second radial face 18). In one embodiment, the angle, $\theta_4$, is in a range between about $0°<\theta_4\leq 30°$. In another embodiment, the angle, $\theta_4$, is in a range between about $10°<\theta_4\leq 20°$. In yet another embodiment, the angle, $\theta_4$, is equal to about 15°.

In one embodiment, the cutting insert 10 may include an optional curved transition region 42 at an intersection of the first axial face 12 and the first radial face 16. However, it will be appreciated that the transition region 42 can be omitted.

Figure 6:
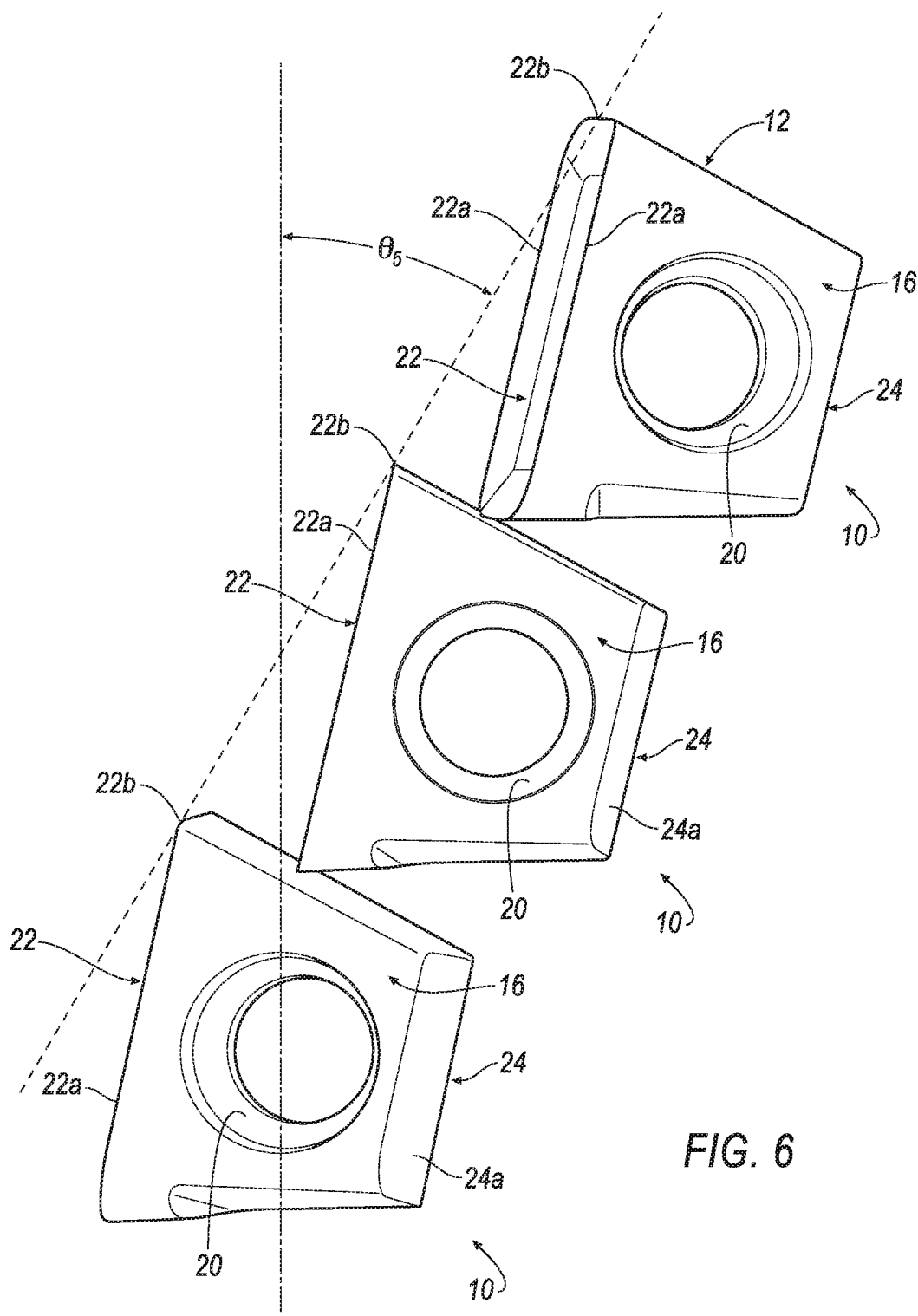
FIG. 6 is a diagram showing the helix angle of the cutting inserts of the invention when mounted in a cutter body.

Referring now to FIG. 6, the cutting insert 10 is tangentially mounted on a cutter body (not shown), such as a milling cutter. Specifically, the active cutting edges 22a, 22b, 22c of each cutting insert 10 lies along a helix having an angle, $\theta_5$, with respect to a central longitudinal axis, $C_L$, of the cutter body. In one embodiment, the helix angle, $\theta_5$, is in a range between about $0°<\theta_5\leq 45°$. In another embodiment, the helix angle, $\theta_5$, is in a range between about $10°<\theta_5\leq 35°$. In yet another embodiment, the helix angle, $\theta_5$, is equal to about 30°. As seen in FIG. 6, the secondary clearance surface 34 allows the cutting insert 10 of the invention to overlap or "nest" when arranged along the helix of the cutter body. This overlap or "nest" feature allows the cutting inserts 10 to be mounted at a relatively smaller helix angle, $\theta_5$, resulting in a more compact arrangement as compared to conventional cutting inserts, thereby allowing more flutes to be formed in the milling cutter (not shown).

Figure 7:
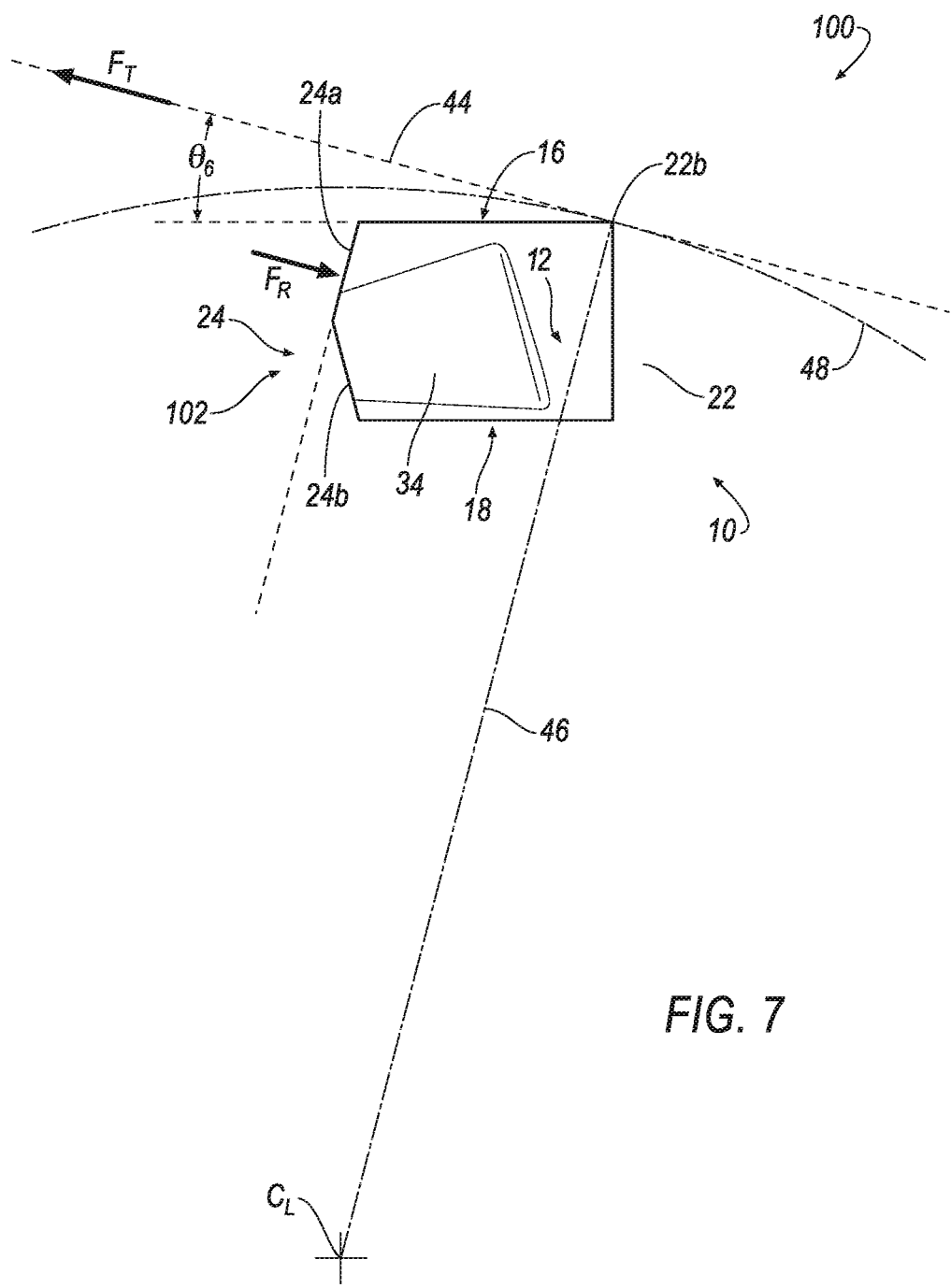
FIG. 7 is a force diagram showing the cutting insert of FIG. 1 mounted in an insert seat of a milling cutter in accordance with an aspect of the invention.

Referring now to FIG. 7, the cutting insert 10 is mounted in an insert seat 102 of a milling cutter 100 with a negative radial rake angle, $\theta_6$, with respect to a tangent line 44 substantially perpendicular to a radial plane 46 extending from the central, longitudinal axis, $C_L$, to a cutting diameter 48 of the cutter body (not shown). In one embodiment, the rake angle, $\theta_6$, is in a range between about $0°\leq\theta_6\leq 30°$. In another embodiment, the rake angle, $\theta_6$, is in a range between about $10°\leq\theta_6\leq 20°$. In yet another embodiment, the rake angle, $\theta_6$, is equal to about 15°.

During a cutting operation, the tangential cutting force, $F_T$, is not applied in line with the tangential side of the cutting insert 10. As mentioned above, the second seating surface 24b is disposed at an angle, $\theta_1$, relative to the first seating surface 24a. In one embodiment, the angle, $\theta_1$, can be in a range between about $120°<\theta_1<180°$. In another embodiment, the angle, $\theta_1$, can be in a range between about $135°\leq\theta_1\leq 165°$. In yet another embodiment, the angle, $\theta_1$, is equal to about 150°.

Figure 4:
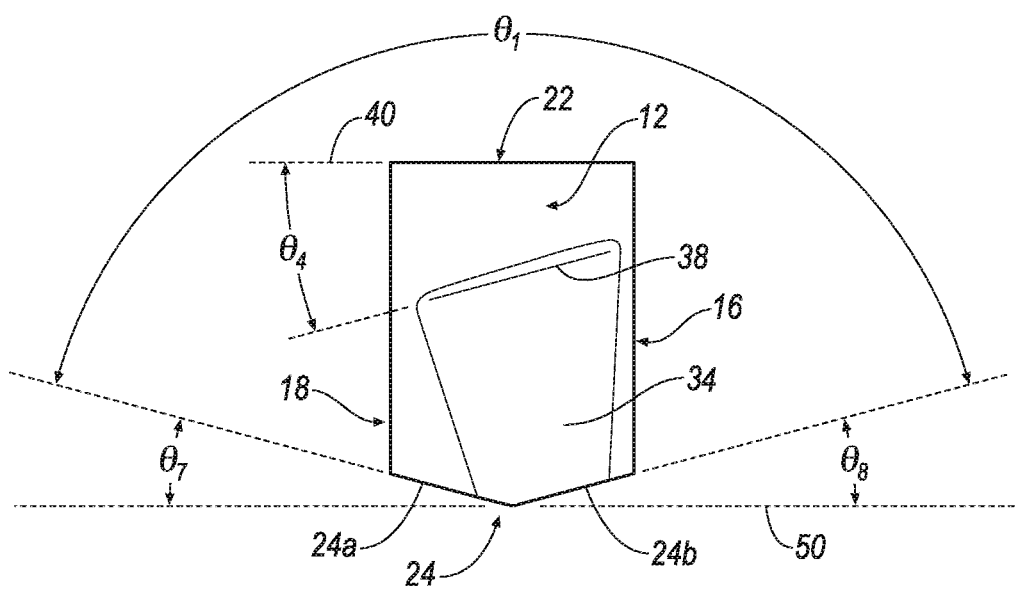
FIG. 4 is a top view of the cutting insert of FIG. 1.
Figure 5:
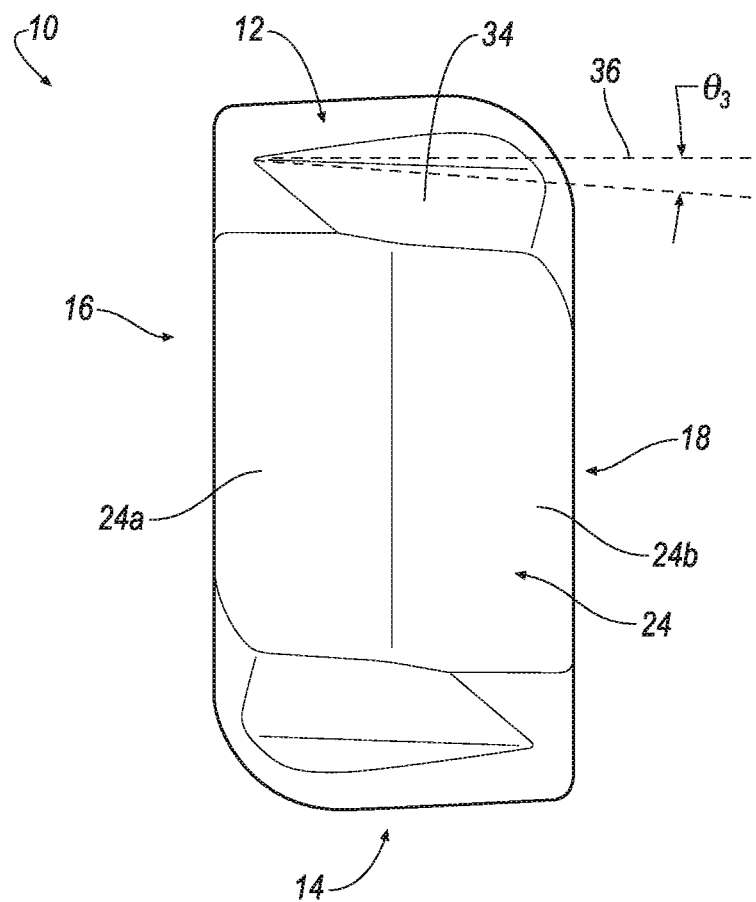
FIG. 5 is a side view of the cutting insert of FIG. 1.

In one embodiment, the cutting insert 10 can be mounted with a radial rake angle, $\theta_6$, equal to about 15°. In this embodiment, the angle, $\theta_1$, can be about 150°, which implies that the first seating surface 24a is formed at an angle, $\theta_7$, with respect to a plane 50 that is tangent to the seating surface 24, and the second seating surface 24b is formed at an angle, $\theta_8$, with respect to the plane 50, as shown in FIG. 4. In one embodiment, the angle, $\theta_7$, can be substantially equal to the angle, $\theta_8$. In this embodiment, the angles, $\theta_7$, $\theta_8$, are substantially equal to about 15° (i.e., (180°150°)/2). In other words, the angles, $\theta_7$, $\theta_8$, are substantially equal to the radial rake angle, $\theta_6$. By forming the first and second seating surfaces 24a, 24b with the same angle as the radial rake angle, $\theta_6$, the first seating surface 24a is substantially perpendicular to the tangential cutting force, $F_T$, and a reaction force, $F_R$, is produced that is in direct opposition to the tangential cutting force, $F_T$, as shown in FIG. 7. In other words, the first seating surface 24a is substantially parallel to the radial plane 46 extending from the central, longitudinal axis, CL, to the cutting diameter 48 of the cutter body. Although the first seating surface 24a is shown as substantially perpendicular to the tangential cutting force, $F_T$, it will be understood that the second seating surface 24b can also mounted in the cutter body (not shown) to be substantially perpendicular to the tangential cutting force, $F_T$, and produce a reaction force, $F_R$, that is in direct opposition to the tangential cutting force, $F_T$.

It will be appreciated that the invention is not limited by the magnitude of the radial rake angle, $\theta_6$, and that the invention can be practiced with any desirable radial rake angle, $\theta_6$, so long as the radial rake angle, $\theta_6$, is a positive value. For example, the principles of the invention can be practiced with a radial rake angle, $\theta_6$, of increments of 1 degree.

As described above, the cutting insert 10 of the invention has a seating face, which is formed at an angle that is substantially equal to the radial rake angle when mounted in a cutter body. As a result, the seating face produces at least one seating surface that is substantially perpendicular to the tangential cutting force, $F_T$, thereby reducing movement of the insert when tangentially mounted in the pocket of the cutter body.

The patents and publications referred to herein are hereby incorporated by reference.

Having described presently preferred embodiments the invention may be otherwise embodied within the scope of the appended claims.

What is claimed is:

1. A milling insert comprising:
   a first axial face, a second axial face, a first radial face, a second radial face parallel with the first radial face, a through-hole passing from the first radial face to the second radial face for tangentially mounting the milling insert in a milling cutter, a cutting face, and a generally V-shaped seating face,
   wherein the generally V-shaped seating face is formed of a first seating surface and a second seating surface disposed at an angle, $\theta_1$, relative to the first seating surface such that the generally V-shaped seating face is convex, at least one of the first seating surface and the second seating surface extending from the first axial face to the second axial face,
   wherein the cutting face defines a plurality of cutting edges at intersections between the cutting face and the first axial face, the second axial face, the first radial face, and the second radial face; and
   wherein the milling insert is indexable about an axis perpendicular to the through-hole and passing through the cutting face.

2. The milling insert of claim 1, wherein $120°<\theta_1<180°$.

3. The milling insert of claim 2, wherein the first seating surface is disposed at an angle, $\theta_7$, with respect to a plane tangent to the generally V-shaped convex seating face, and wherein the second seating surface is disposed at an angle, $\theta_8$, with respect to the plane tangent to the generally V-shaped seating face.

4. The milling insert of claim 1, wherein:
the first axial face is disposed at a clearance angle, $\theta_2$, relative to a plane perpendicular to the cutting face; and
$0° < \theta_2 \le 30°$.

5. The milling insert of claim 4, wherein the first axial face defines a secondary clearance surface, the secondary clearance surface being at least partially axially recessed from the first axial face and oblique to the first radial face.

6. The milling insert of claim 5, wherein the secondary clearance surface is disposed at an angle, $\theta_3$, relative to a plane perpendicular to the first radial face; and
$0° < \theta_3 \le 15°$.

7. The milling insert of claim 1, further comprising a curved transition region at an intersection of the first axial face and the first radial face.

8. A milling cutter defining a central, longitudinal axis, the milling cutter comprising:
at least one generally V-shaped concave insert seat having a first seating surface and a second seating surface;
at least one milling insert mounted in the at least one generally V-shaped concave insert seat, the at least one milling insert comprising:
a first axial face, a second axial face, a first radial face, a second radial face parallel with the first radial face, a through-hole passing from the first radial face to the second radial face for tangentially mounting the at least one milling insert in the milling cutter, a cutting face, and a generally V-shaped seating face formed of a first seating surface and a second seating surface disposed at an angle, $\theta_1$, relative to the first seating surface of the at least one milling insert such that the generally V-shaped seating face is convex,
wherein at least one of the first seating surface of the at least one milling insert and the second seating surface of the at least one milling insert extends from the first axial face to the second axial face,
wherein the cutting face defines a plurality of cutting edges at intersections between the cutting face and the first axial face, the second axial face, the first radial face, and the second radial face;
and wherein the at least one milling insert is indexable about an axis perpendicular to the through-hole and passing through the cutting face.

9. The milling cutter of claim 8, wherein:
$120° < \theta_2 < 180°$.

10. The milling cutter of claim 9, wherein the first seating surface of the at least one milling insert is substantially parallel to a radial plane extending from the central, longitudinal axis to a cutting diameter of the milling cutter.

11. The milling cutter of claim 9, wherein the first seating surface of the at least one milling insert is disposed at an angle, $\theta_7$, with respect to a plane tangent to the generally V-shaped convex seating face, and wherein the second seating surface of the at least one milling insert is disposed at an angle, $\theta_8$, with respect to the plane tangent to the generally V-shaped convex seating face.

12. The milling cutter of claim 11, wherein the angles, $\theta_7$, $\theta_8$, are substantially equal to a radial rake angle, $\theta_6$, when the cutting insert is mounted in the at least one V-shaped concave insert seat of the milling cutter.

13. The milling cutter of claim 8, wherein:
the first axial face is disposed at a clearance angle, $\theta_2$, relative to a plane perpendicular to the cutting face; and
$0° < \theta_2 \le 30°$.

14. The milling cutter of claim 13, wherein the first axial face defines a secondary clearance surface, the secondary clearance surface being at least partially axially recessed from the first axial face and oblique to the first radial face.

15. The milling cutter of claim 14, wherein the secondary clearance surface is disposed at an angle, $\theta_3$, relative to a plane perpendicular to the first radial face; and
$0° < \theta_3 \le 15°$.

16. The milling cutter of claim 8, further comprising a curved transition region at an intersection of the first axial face and the first radial face.

* * * * *